(12) United States Patent
Osakabe et al.

(10) Patent No.: US 11,215,571 B2
(45) Date of Patent: Jan. 4, 2022

(54) X-RAY ANALYSIS APPARATUS

(71) Applicant: Rigaku Corporation, Akishima (JP)

(72) Inventors: Takeshi Osakabe, Ome (JP); Tetsuya Ozawa, Hino (JP); Kazuki Omoto, Akishima (JP)

(73) Assignee: RIGAKU CORPORATION, Tokyo (JP)

( * ) Notice: Subject to any disclaimer, the term of this patent is extended or adjusted under 35 U.S.C. 154(b) by 0 days.

(21) Appl. No.: 16/823,929

(22) Filed: Mar. 19, 2020

(65) Prior Publication Data

US 2020/0300789 A1   Sep. 24, 2020

(30) Foreign Application Priority Data

Mar. 19, 2019 (JP) .............................. JP2019-050689

(51) Int. Cl.
*G01N 23/20016*   (2018.01)
*G01N 23/20025*   (2018.01)
(Continued)

(52) U.S. Cl.
CPC ..... *G01N 23/20016* (2013.01); *G01N 23/207* (2013.01); *G01N 23/20008* (2013.01);
(Continued)

(58) Field of Classification Search
CPC ............. G01N 23/20; G01N 23/20008; G01N 23/20016; G01N 23/20025; G01N 23/201; G01N 23/207; G01N 23/2076; G01N 2223/05; G01N 2223/054; G01N 2223/056; G01N 2223/30; G01N 2223/307;
(Continued)

(56) References Cited

U.S. PATENT DOCUMENTS 2,380,236 A    7/1945 Harker
4,364,122 A  * 12/1982 Wolfel ................. G01N 23/207
378/73
(Continued)

FOREIGN PATENT DOCUMENTS

| JP | H0584850 U    | 11/1993 |
| JP | H11281595 A   | 10/1999 |
| JP | 2007017258 A  | 1/2007  |
| JP | 2015102432 A  | 6/2015  |

OTHER PUBLICATIONS

EPO Extended European Search Report for EP Application No. 20156330.1; dated, Aug. 11, 2020.

*Primary Examiner* — Anastasia Midkiff
(74) *Attorney, Agent, or Firm* — Cantor Colburn LLP

(57) ABSTRACT

Provided is an X-ray analysis apparatus including: a goniometer including an incident-side arm extending in a first direction, a fixing portion, and a receiving-side arm; an X-ray source portion, which is arranged on the incident-side arm and generates an X-ray source extending in a second direction, which crosses the first direction; a support base, which is arranged on the fixing portion, and is configured to support a sample; a parallel slit, which is arranged on the fixing portion, and is configured to limit a line width along the second direction of the X-ray source generated by the X-ray source portion; and a detector, which is arranged on the receiving-side arm, and is configured to detect a scattered X-ray generated by the sample.

3 Claims, 4 Drawing Sheets

(51) Int. Cl.
*G01N 23/207* (2018.01)
*G01N 23/20008* (2018.01)
*G21K 1/04* (2006.01)
*G21K 1/06* (2006.01)

(52) U.S. Cl.
CPC ......... *G01N 23/20025* (2013.01); *G21K 1/04* (2013.01); *G21K 1/06* (2013.01); *G01N 2223/3301* (2013.01)

(58) Field of Classification Search
CPC ....... G01N 2223/308; G01N 2223/309; G01N 2223/316; G01N 2223/32; G01N 2223/321; G01N 2223/33; G01N 2223/3301; G01N 2223/3303; G01T 1/36; G21K 1/02; G21K 1/04; G21K 1/043; G21K 1/046; G21K 1/06; G21K 5/10
See application file for complete search history.

(56) References Cited

U.S. PATENT DOCUMENTS

| | | | |
|---|---|---|---|
| 6,041,098 A | 3/2000 | Touryanski et al. | |
| 6,459,763 B1* | 10/2002 | Koinuma | G01N 23/207 378/71 |
| 7,035,373 B2* | 4/2006 | Omote | G21K 1/06 378/79 |
| 7,443,952 B2* | 10/2008 | Dosho | G01N 23/20 378/71 |
| 7,483,512 B2* | 1/2009 | Berti | G01N 23/207 378/70 |
| 8,102,967 B2* | 1/2012 | Suominen | G01N 23/20016 378/81 |
| 2015/0146861 A1 | 5/2015 | Kobayashi et al. | |

* cited by examiner

X-RAY ANALYSIS APPARATUS

CROSS-REFERENCE TO RELATED APPLICATION

The present invention claims priority under 35 U.S.C. § 119 to Japanese Patent Application 2019-50689 filed on Mar. 19, 2019, the entire contents of which is incorporated herein by reference.

BACKGROUND OF THE INVENTION

1. Field of the Invention

This disclosure relates to an X-ray analysis apparatus, and more particularly, to a technology of achieving downsizing of the apparatus and measurement of a minute sample.

2. Description of the Related Art

An X-ray analysis apparatus generally includes a goniometer including two arms. An X-ray source and an incident-side optical component are arranged on one arm, and a detector and a receiving-side optical component are arranged on the other arm.

An X-ray analysis apparatus including a parallel slit on an incident side of a sample is used. In Japanese Patent Application Laid-open No. H 11-281595, a Schulz slit arranged on an incident side of a sample is disclosed. In Japanese Patent Application Laid-open No. 2015-102432, a length limiting slit arranged on an incident side of a sample is disclosed.

In recent years, there has been an increasing demand for X-ray analysis apparatus capable of measuring a minute portion. As disclosed in Japanese Patent Application Laid-open No. Hei 11-281595 and Japanese Patent Application Laid-open No. 2015-102432, with the use of the Schulz slit (or length limiting slit), a line width of an X-ray beam on the incident side can be limited, and hence a region of the sample to be irradiated with the X ray can be limited.

It is required of the X-ray analysis apparatus to be downsized and used in general purpose. In a general-purpose X-ray analysis apparatus, a goniometer generally has long arms, and hence a variety of optical system components can be arranged on the arms. However, when the X-ray analysis apparatus is downsized, an optical system including an X-ray generator and an incident optical system component is disadvantageously limited.

SUMMARY OF THE INVENTION

This disclosure has been made in view of the above-mentioned problem, and therefore has an object to provide an X-ray analysis apparatus configured to achieve an optical system capable of measuring a minute sample, said X-ray analysis apparatus having a simple configuration and a small size.

(1) In order to solve the above-mentioned problem, an X-ray analysis apparatus according to at least one embodiment of this disclosure includes: a goniometer including an incident-side arm extending in a first direction, a fixing portion, and a receiving-side arm; an X-ray source portion, which is arranged on the incident-side arm and generates an X-ray source extending in a second direction, which crosses the first direction; a support base, which is arranged on the fixing portion, and is configured to support a sample; a parallel slit, which is arranged on the fixing portion, and is configured to limit a line width along the second direction of the X-ray source generated by the X-ray source portion; and a detector, which is arranged on the receiving-side arm, and is configured to detect a scattered X-ray generated by the sample.

(2) The X-ray analysis apparatus according to Item (1) may further include a moving mechanism configured to move the parallel slit in the second direction.

(3) In the X-ray analysis apparatus according to Item (1) or (2), the parallel slit may have a shape that forms a part of a hollow circle.

According to at least one embodiment of this disclosure, there is provided the X-ray analysis apparatus configured to achieve the optical system capable of measuring a minute portion with a simple configuration and a small size.

DETAILED DESCRIPTION OF THE INVENTION

Figure 1:
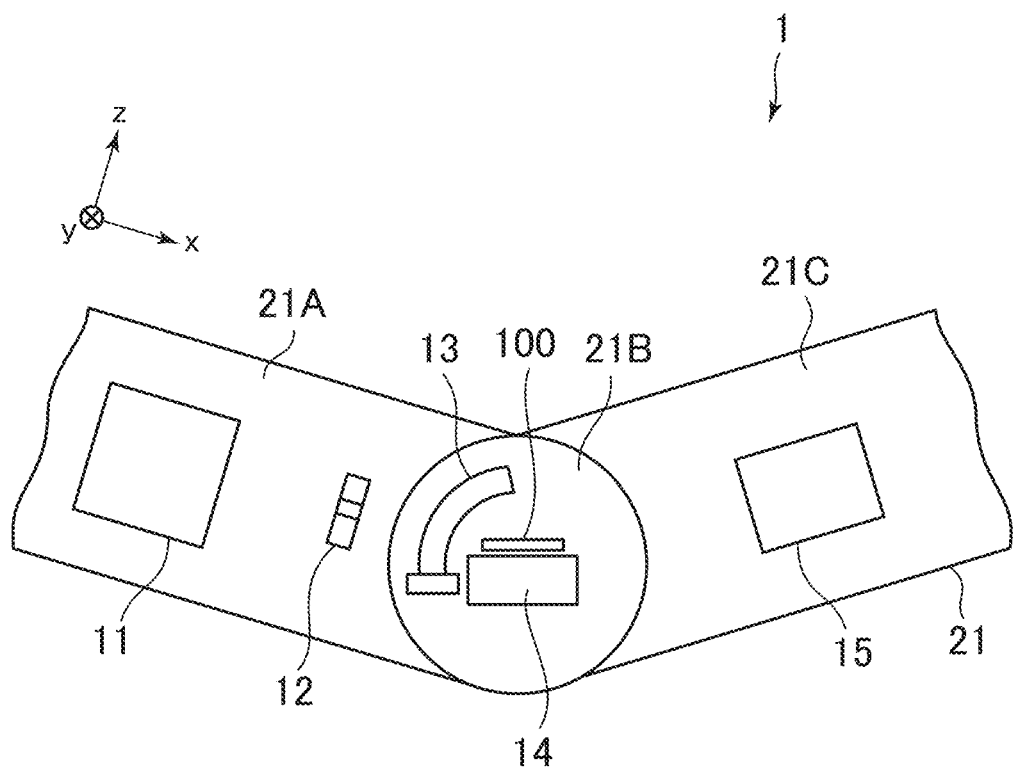
FIG. 1 is a schematic diagram for illustrating a configuration of an X-ray analysis apparatus according to a first embodiment of this disclosure.

Now, at least one embodiment of this disclosure is described with reference to the drawings. For clearer illustration, some sizes, shapes, and the like are schematically illustrated in the drawings in comparison to actual ones. However, the sizes, the shapes, and the like are merely an example, and do not limit understanding of the present invention.

Further, like elements as those described relating to the drawings already referred to are denoted by like reference symbols herein and in each of the drawings, and detailed description thereof is sometimes omitted as appropriate.

First Embodiment

Figure 2:
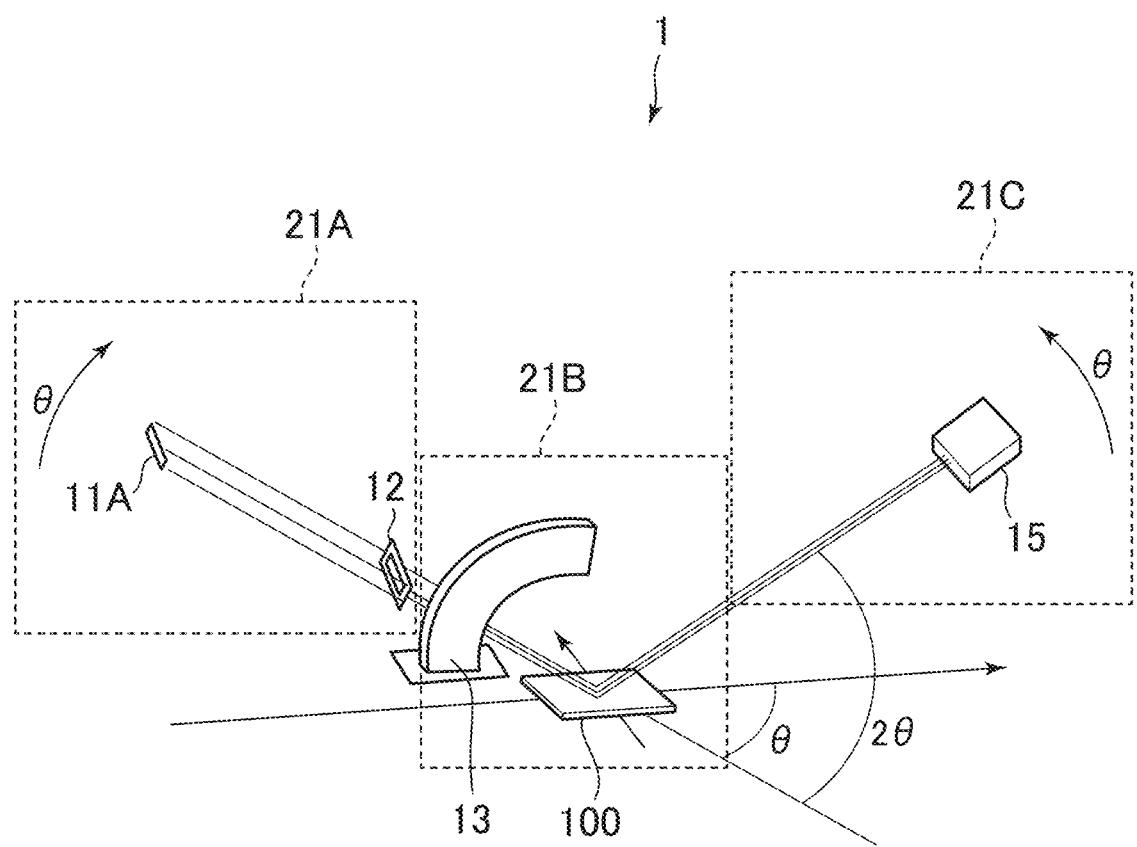
FIG. 2 is a schematic view for illustrating a function of the X-ray analysis apparatus according to the first embodiment of this disclosure.

FIG. 1 is a schematic diagram for illustrating a configuration of an X-ray analysis apparatus 1 according to a first embodiment of this disclosure. FIG. 2 is a schematic view for illustrating a function of the X-ray analysis apparatus 1 according to the first embodiment. In FIG. 2, for simple description of the function, main parts are schematically illustrated. In this example, the X-ray analysis apparatus 1 according to the first embodiment is an X-ray diffraction measurement apparatus (XRD). However, without being limited thereto, the X-ray analysis apparatus 1 may be a small-angle X-ray scattering measurement apparatus (SAXS), or further, another X-ray analysis apparatus. The X-ray analysis apparatus 1 according to the first embodiment includes an X-ray source portion 11, an incident-side slit 12, a parallel slit 13, a support base 14 configured to support a sample 100, a two-dimensional detector 15, and a goniometer 21.

The goniometer 21 is a horizontal sample mount θ-θ goniometer. The goniometer 21 includes an incident-side arm 21A, a fixing portion 21B, and a receiving-side arm 21C. The X-ray source portion 11 and the incident-side slit 12 are arranged on the incident-side arm 21A, the parallel slit 13 and the support base 14 are arranged on the fixing portion 21B, and the two-dimensional detector 15 is mounted on the receiving-side arm 21C. The goniometer 21 can perform 2θ scan while horizontally holding the sample 100 supported on the support base 14. Through horizontal mounting of the sample 100, the effect of distortion caused by the self-weight of the sample 100 can be minimized, and a risk of a drop of the sample 100 can be suppressed. In the goniometer 21, when the incident-side arm 21A (X-ray source portion 11) is rotated by an angle of θ with respect to the fixing portion 21B (support base 14), the receiving-side arm 21C (two-dimensional detector 15) is rotated by an angle of θ in reverse with respect to the fixing portion 21B. In other words, the receiving-side arm 21C is relatively rotated by an angle of 2θ with respect to the incident-side arm 21A.

The X-ray source portion 11 includes a rotor target. Through irradiation of the rotor target with an electron beam having a linear cross section, X-rays are generated from the surface of the rotor target. With a slit window arranged in parallel to an axis of rotation of the rotor target, of the X-rays generated by the rotor target, X-rays transmitted through the slit window are emitted to the outside.

A direction of extension of the incident-side arm 21A (direction of propagation of the X-rays passing through the slit window: first direction) is defined here as an "x-axis direction". A plane perpendicular to the x-axis direction is defined as a "yz plane", a direction passing through a revolved cross section of the incident-side arm 21A is defined as a "y-axis direction", and a direction parallel to the revolved cross section is defined as a "z-axis direction". The X-ray source portion 11 may be regarded to have a linear X-ray source 11A extending in the y-axis direction (second direction). As long as the X-ray source portion 11 includes (or may be regarded to include) the linear X-ray source 11A, the X-ray source portion 11 is not limited to the rotor target, and may be a sealed-off tube, for example. It is desired that the second direction be perpendicular to the first direction, but may be any direction crossing the first direction. Even in that case, it is desired that an angle formed by the first direction and the second direction be 85° or more (90° or less). Further, it is desired that the second direction be parallel to the plane (xy plane) of the incident-side arm 21A.

The incident-side slit 12 is a single slit having a longitudinal direction in the y-axis direction, and is configured to limit divergence in the z-axis direction of the X-rays generated by the X-ray source portion 11 (width in the z-axis direction of the single slit is appropriately selected).

The parallel slit 13 includes two parallel plates opposed to each other while keeping a gap of a first width W. Each parallel plate has a shape forming a part (arc) of a hollow circle (ring shape). In other words, each parallel plate has a shape formed by cutting the hollow circle by two straight lines passing through the center of the hollow circle. In this example, an arc forming the outer edge has a radius of 55 mm, and an arc forming the inner edge has a radius of 35 mm. In this case, the parallel slit 13 has a length L (to be described later) of 20 mm, and the first width W of about 0.44 mm. A stacking direction of the two parallel plates is set along the y-axis direction. The radius of the arc forming the inner edge is determined by the size of the support base 14 configured to support the sample 100. In this example, a region in which the sample 100 is arranged is contained within a distance of 21.5 mm from the center of the sample 100. For example, the sample 100 has a plate shape having a length of 35 mm. It is desired that the position of the center (of the circle) of the shape forming a part of the hollow circle be arranged on the surface of the sample 100. Depending on assembly accuracy, the position of the center may be inside the sample 100 or in the vicinity of the sample 100. The parallel slit 13 is equivalent to the structure in which a plurality of single slits having the first width W are arrayed, and has a function of limiting a line width along the y-axis direction. The parallel slit is also sometimes called as a "Schulz slit".

The support base 14 configured to support the sample 100 is arranged (fixed) on the fixing portion 21B along with the parallel slit 13. Relative positional relationship between the parallel slit 13 and the sample 100 supported by the support base 14 is fixed, and is independent of the rotations of the incident-side arm 21A and the receiving-side arm 21C of the goniometer 21.

The two-dimensional detector 15 is configured to detect scattered X-rays generated by the sample 100. The scattered X-rays include diffracted X-rays generated by the sample 100. Moreover, in the first embodiment, the detector is not limited to the two-dimensional detector, and may be a one-dimensional detector or a zero-dimensional detector (for example, scintillation counter).

Figure 3:
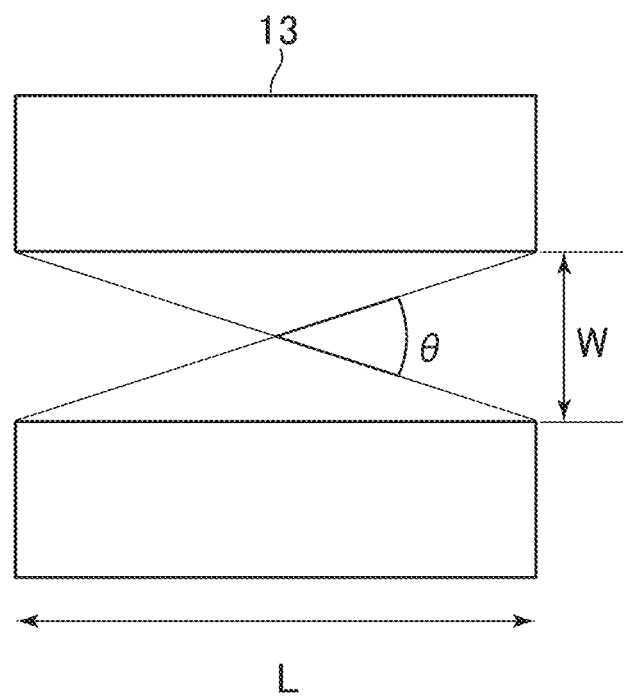
FIG. 3 is a schematic view for illustrating the structure of a parallel slit in the first embodiment of this disclosure.

FIG. 3 is a schematic view for illustrating the structure of the parallel slit 13 in the first embodiment. In FIG. 3, a cross section of the parallel slit 13 taken along the xy plane is illustrated. As described above, the parallel slit 13 has the structure in which the single slits having the first width W are arranged in one direction continuously without any interval, and when the length (distance between the arc of the outer edge and the arc of the inner edge) of the parallel slit 13 is represented by L, an divergence angle θ illustrated in FIG. 3 is expressed as: θ=2 arctan(W/L). For θ to be 2.5° or less when W=0.5 mm, it is required that the length L of the parallel slit 13 be 22.91 mm or more.

The X-ray analysis apparatus 1 according to the first embodiment can achieve, by a simple method, a Bragg-Brentano optical system (collecting method) or a minute-portion (point) measurement apparatus by means of a parallel beam method, which uses the linear X-ray source 11A. With the combined use of the parallel slit 13 and the two-dimensional detector (N-dimensional detector: N=0, 1, or 2), smearing is prevented from being generated.

In the X-ray analysis apparatus 1 according to the first embodiment, the linear X-ray source 11A is used to achieve an optical system with a large amount (high flux) of an X-ray beam with which to irradiate the sample 100. Further, with the combination of the parallel slit 13, switching to a minute-portion optical system can be performed in a simple manner.

With the fixed positional relationship of the sample 100 and the parallel slit 13 and the shape of (two parallel plates of) the parallel slit 13, variations in intensity of the X-ray beam with which to irradiate the sample 100 with respect to the rotation of the goniometer 21 are reduced. In the Bragg-Brentano optical system, measurement in which an irradiation area of the X-ray beam is substantially and uniformly limited can be performed. Therefore, through collection of light while limiting the irradiation area, the variations in intensity depending on the orientation of the sample can be reduced.

The X-ray analysis apparatus 1 according to the first embodiment can be achieved in a simple manner with the use of an existing X-ray source and an existing incident-side optical component, for example, except that the parallel slit 13 is arranged on the fixing portion 21B, on which the support base 14 is arranged. The X-ray analysis apparatus 1 according to the first embodiment is an optical system configured to measure a minute portion, and is most suitable for pole measurement and stress measurement in addition to the measurement of the minute portion.

Second Embodiment

An X-ray analysis apparatus 1 according to a second embodiment of this disclosure has the same configuration as that of the X-ray analysis apparatus 1 according to the first embodiment except that the parallel slit 13 includes a moving mechanism 25 configured to move the parallel slit 13 at least in the y-axis direction.

Figure 4A:
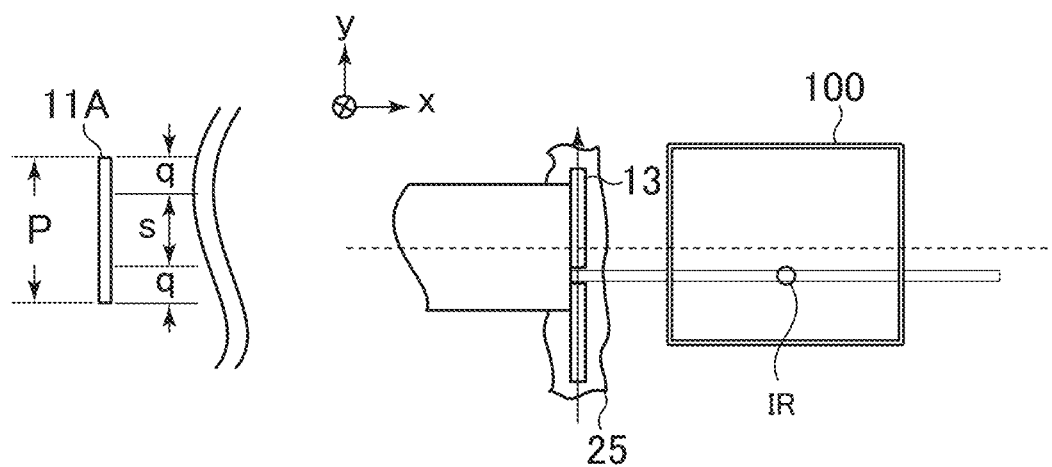
FIG. 4A is a schematic view for illustrating a configuration of a main part of an X-ray analysis apparatus according to a second embodiment of this disclosure.
Figure 4B:
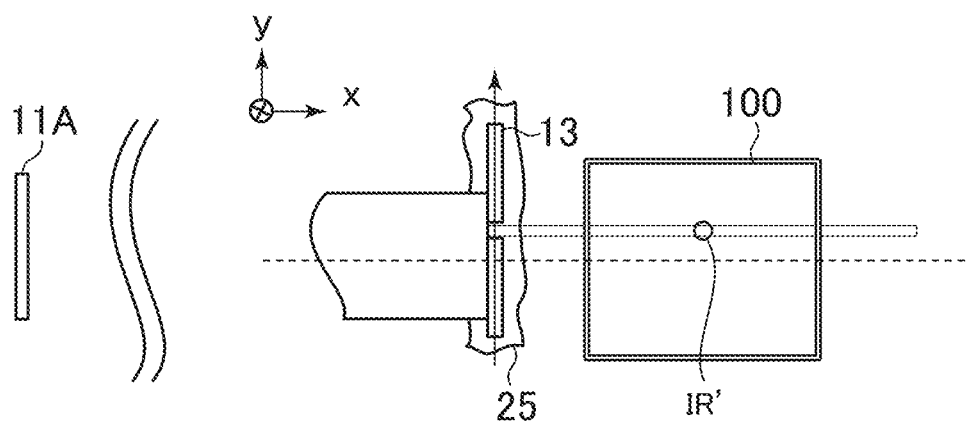
FIG. 4B is a schematic view for illustrating the configuration of the main part of the X-ray analysis apparatus according to the second embodiment of this disclosure.

FIG. 4A and FIG. 4B are schematic views for illustrating a configuration of a main part of the X-ray analysis apparatus 1 according to the second embodiment. With the parallel slit 13 including the moving mechanism 25, a slit portion of the parallel slit 13 can be moved in the y-axis direction. In FIG. 4A and FIG. 4B, the parallel slit 13 at different positions and different regions (irradiation regions IR and IR') of the sample 100 irradiated with the X-ray beam through the scanning in the y-axis direction are illustrated. As a result, mapping measurement in the y-axis direction can be performed with the sample 100 being fixed.

Through restricting the movement of the slit portion (gap of the first width W) of the parallel slit 13 along the y-axis direction within a range of both linear ends (range of linear length P) of the linear X-ray source 11A in the y-axis direction, the variations in intensity of the X-ray beam with which to irradiate the sample 100 can be reduced for the scanning in the y-axis direction. Further, near the both linear ends of the linear X-ray source 11A, the intensity of the X-ray beam is also reduced. Therefore, in order to avoid the effect of the both end portions, it is further desired that the movement of the slit portion of the parallel slit 13 in the y-axis direction be restricted to the inside of a predetermined length q from each of the both linear ends. In other words, a movement range s of the parallel slit 13 is P-2q. In this example, the linear length P of the linear X-ray source 11A is about 12 mm, and the sample position has a range of about 20 mm. The predetermined length q for satisfactorily suppressing the effect of the both linear ends is about 4 mm, and hence the movement range of the slit portion of the parallel slit 13 along the y-axis direction is about 4 mm.

In the X-ray analysis apparatus 1 according to the second embodiment, the mapping measurement with the sample 100 being fixed can be performed. Further, during the mapping measurement, variations in amount of the X-ray beam with which to irradiate the sample 100 is reduced.

In the second embodiment, the parallel slit 13 includes the moving mechanism 25, and the moving mechanism 25 is configured to move the parallel slit 13 in the y-axis direction. However, this disclosure is not limited thereto. The parallel slit 13 may be fixed, and a moving mechanism configured to move the support base 14 may be included. In this case, the moving mechanism can move the sample 100 in the y-axis direction by moving the support base 14 in the y-axis direction. Further, with the moving mechanism moving the support base 14 on the xy plane, the mapping measurement of the sample 100 can be performed.

The X-ray analysis apparatus according to each of the embodiments of this disclosure has been described above. In the above-mentioned embodiments, the shape of each of the two parallel plates of the parallel slit 13 is the shape that forms a part of the hollow circle, but this disclosure is not limited thereto. When the goniometer 21 has a small rotation range (small θ), the shape of each of the two parallel plates of the parallel slit 13 may be rectangular, and an appropriate shape may be selected as required. Further, in view of downsizing the apparatus, on the incident side of the X-ray analysis apparatus 1 according to each of the above-mentioned embodiments, only the X-ray source portion 11, the incident-side slit 12, and the parallel slit 13 are arranged so that the optical system is formed with a simple configuration, but an optical component configured to collimate the X-rays and other components may be further arranged as required. Further, on the receiving side of the X-ray analysis apparatus 1 according to each of the above-mentioned embodiments, only the two-dimensional detector 15 is arranged, but optical components, such as a receiving-side slit, may be arranged as required.

In the above-mentioned embodiments, the variations in intensity of the X-ray beam depending on the orientation of the sample can be reduced. In particular, the measurement in which the irradiation area of the X-ray beam is substantially and uniformly limited can be performed. Therefore, through collection of light while limiting the irradiation area, the variations in intensity depending on the orientation of the sample can be reduced.

The goniometer 21 of the X-ray analysis apparatus 1 according to each of the above-mentioned embodiments is a horizontal sample mount θ-θ goniometer. However, this disclosure is not limited thereto, and the geometer 21 may be a 2θ-θ goniometer, in which the incident-side arm 21A is fixed, the fixing portion 21B is rotated by an angle of θ with respect to the incident-side arm 21A, and the receiving-side arm 21C is rotated by an angle of 2θ with respect to the incident-side arm 21A.

While there have been described what are at present considered to be certain embodiments of the invention, it will be understood that various modifications may be made thereto, and it is intended that the appended claims cover all such modifications as fall within the true spirit and scope of the invention.

What is claimed is:
1. An X-ray analysis apparatus, comprising:
   a goniometer including an incident-side arm extending in a first direction, a fixing portion, and a receiving-side arm;
   an X-ray source, which is arranged on the incident-side arm and configured to generate an X-ray beam extending in a second direction, which crosses the first direction;
   a support base, which is arranged on the fixing portion, and is configured to support a sample;
   a parallel slit, which is arranged on the fixing portion, and is configured to limit a line width along the second direction of the X-ray beam generated by the X-ray source; and
   a detector, which is arranged on the receiving-side arm, and is configured to detect a scattered X-ray generated by the sample,
   wherein a relative positional relationship between the support base and the parallel slit is fixed.
2. The X-ray analysis apparatus according to claim 1, further comprising a moving mechanism configured to move the parallel slit in the second direction.

3. The X-ray analysis apparatus according to claim 1, wherein the parallel slit has an arc shape.

\* \* \* \* \*